Feb. 28, 1961  C. VAN DER LELY ET AL  2,972,852
DEVICE FOR LATERALLY DISPLACING GRASS, HAY OR
OTHER MATERIAL LYING ON THE GROUND
Original Filed Dec. 3, 1953  2 Sheets-Sheet 1
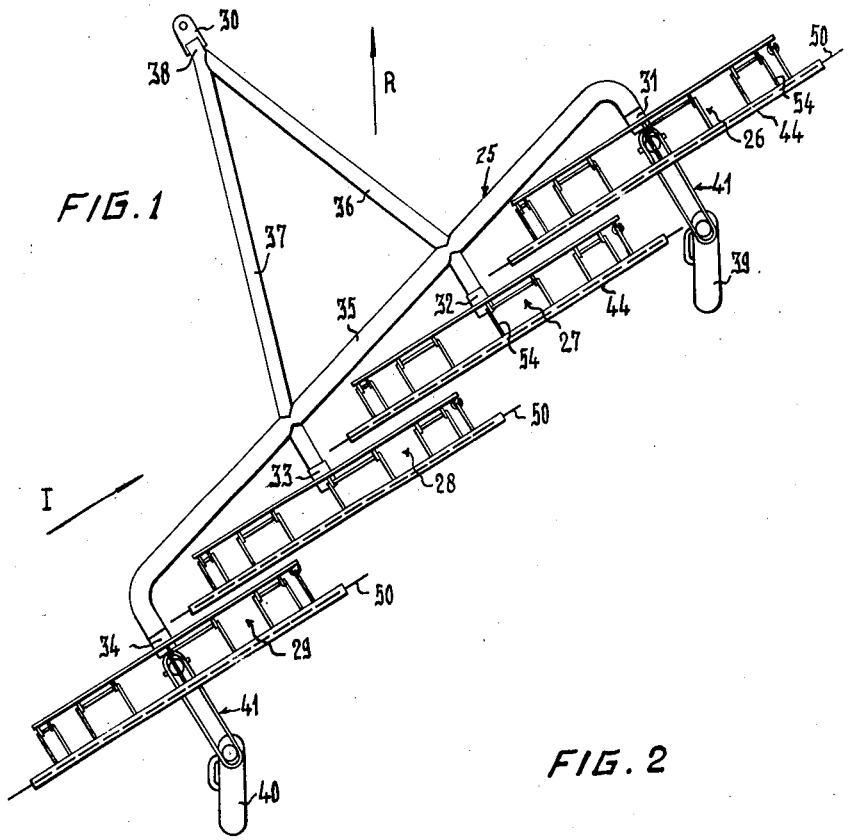
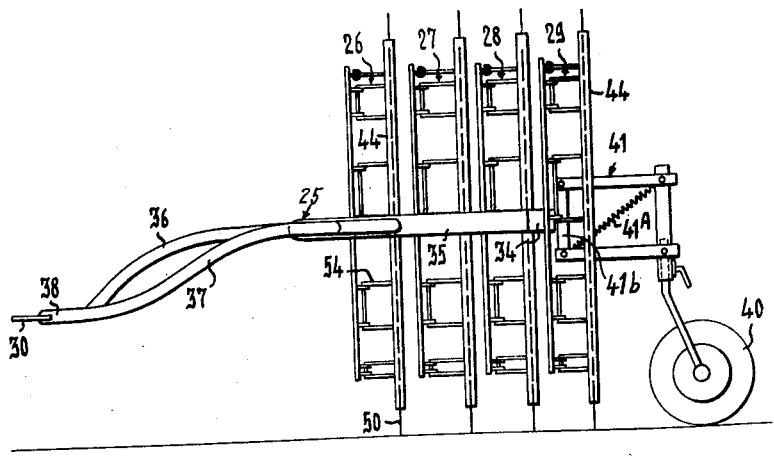
INVENTORS
Cornelis van der Lely
and Ary van der Lely
BY
Mason & Mason
Attys.

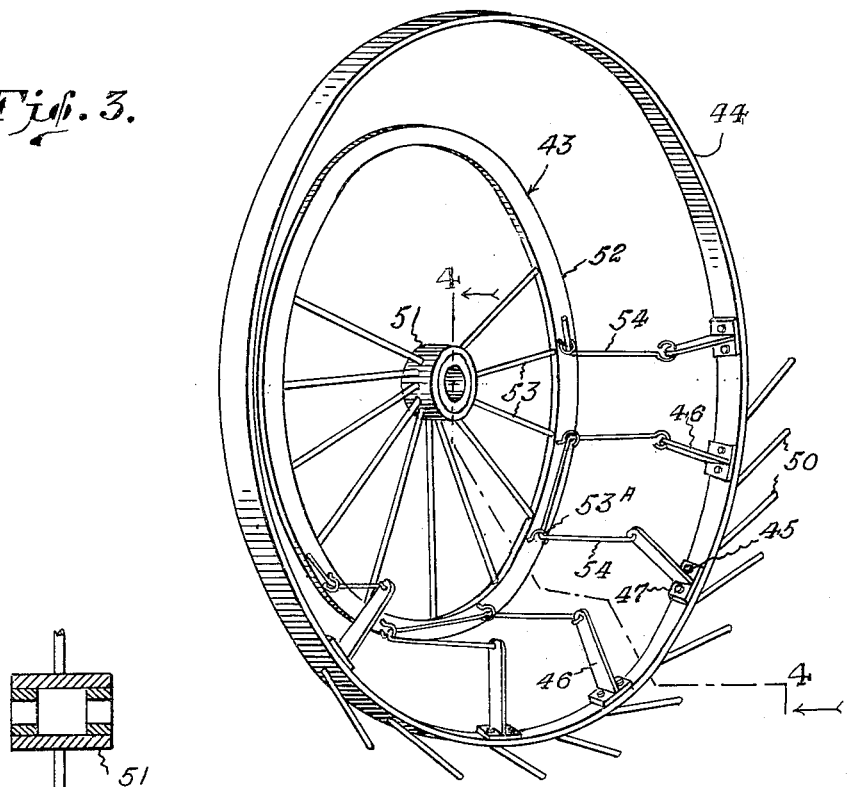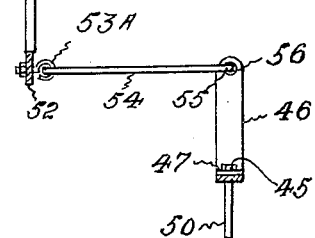

United States Patent Office 2,972,852
Patented Feb. 28, 1961

2,972,852

DEVICE FOR LATERALLY DISPLACING GRASS, HAY OR OTHER MATERIAL LYING ON THE GROUND

Cornelis van der Lely and Ary van der Lely, Maasland, Netherlands, assignors to C. van der Lely N.V., Maasland, Netherlands, a Dutch limited company Original application Dec. 3, 1953, Ser. No. 395,958, now Patent No. 2,861,413, dated Nov. 25, 1958. Divided and this application Oct. 13, 1958, Ser. No. 766,743

18 Claims. (Cl. 56—377)

This invention relates to a device for laterally displacing grass, hay, or other material lying on the ground comprising a frame with a number of rake wheels arranged in an echelon in overlapping relationship on the frame and at an angle to its direction of travel. The rake wheels are provided with a number of circumferential teeth or like catching means and are put into rotation by contact with the ground.

An object of the present invention is to provide a device of the foregoing type having raking members with a comparatively large working width, the rake being of simple, light, and cheap construction. As is set forth in more detail hereinafter the axles for the rake wheels are rigidly connected to the frame of the device.

Further objects and advantages of the invention will appear from the following description with reference to the accompanyingd rawings.

This is a division of application Serial No. 395,958, now Patent 2,861,413, filed December 3, 1953.

In the drawings:

Figure 1 is a plan view of the raking device according to this invention;

Figure 2 shows the device of Figure 1 in a side elevation seen in the direction of the arrow I;

Figure 3 is an enlarged perspective fragmentary side elevation of the flexible band portion and of the rigid wheel portion of the raking member of the device according to Figures 1 and 2; and Figure 4 is an enlarged sectional view taken on line IV—IV of Figure 3.

Referring to the figures, four rake wheels, 26, 27, 28 and 29, are rotatably mounted in echelon in overlapping relationship on short parallel and horizontal axles 31, 32, 33, and 34, fixedly connected to a beam 35 of the vehicular frame 25. The frame further comprises two rods 36 and 37 fixed to the beam 35 and intersecting each other in a point 38 located at a lower elevation than the beam. At such location there is a fastening member 30 which permits the frame's connection to a tractor or other traction means. The frame is supported by two running wheels 39 and 40, of which only the latter has been shown in Figure 2. The running wheels 39 and 40 are connected to one of the axles 31 and 34, respectively, through a parallelogram 41 of hinge rods, hinge rods 41B being secured to axle 34. By means of springs 41A in the parallelogram 41 the greater part of the weight of the frame and that of the four rake wheels is resiliently transmitted to the running wheels 39 and 40. The running wheel 40 may be locked in a definite position by any suitable securing means within the choice of those skilled in the art, whereas the running wheel 39 is adapted to adjust itself freely.

Detailed construction of the rake wheels is shown in Figures 3 and 4. The ring 44 is a resilient steel band upon which base pieces 47, with inwardly extending flat bars 46, integral with or secured thereto, are screwed or riveted by rivets or screw means 45, said band being the raking teeth supporting means in that it carries a plurality of resilient teeth 50 serving as raking elements.

The resilient band 44 is kept in place by means of a rigid central portion comprising a wheel designated generally by reference character 43 which according to Figures 3 and 4 is composed of a hub 51 and a rim 52 interconnected by spokes 53, the rim 52 being provided with eyelets 53A. Every two eyelets 53A carry a bow 54 which is fashioned from rods of steel wire or other suitable material. It will, of course, be appreciated that the entire assembly shown in Figure 3 constitutes a rake wheel such as are designated 26, 27, 28 and 29 in Figures 1 and 2. Accordingly, the elements 51, 52, 53 and 53A together with elements 44, 45, 46, 47 and 54, the former making up the relatively rigid portion of the rake wheel and the latter elements the relatively resilient portion, will be understood to constitute parts in each of such rake wheels.

The rake wheel 43 is mounted upon one of the axles 31—34 and moves a great part of the material being displaced to the left, the remaining part of the material being displaced completely to the left by the band 44 provided with teeth 50. The support of the band 44 by the wheel 43 is such that the band remains substantially circular except for the lower portion which will have a flat portion (not shown) when the rake wheel is bearing on the ground.

The above description and drawings disclose a single embodiment of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

We claim:

1. A side delivery rake comprising a mobile frame, a plurality of horizontal axles rigidly connected to said frame and extending outwardly therefrom, a rake wheel rotatably mounted on each of said axles, said rake wheels being arranged in an echelon on said frame and obliquely with respect to the intended direction of travel thereof, said rake wheels incorporating raking teeth and substantially resilient means providing support for said raking teeth.

2. A side delivery rake according to claim 1 wherein said axles are connected on their forward end to said frame and said frame includes a beam extending along and forward of the echelon of rake wheels.

3. A side delivery rake according to claim 2 having means operatively associated with at least one of said axles for resiliently supporting said beam for elevational movement.

4. A side delivery rake according to claim 2 having traction means and at least one supporting wheel, said traction means and said supporting wheel being located on different sides of said echelon of rake wheels and being interconnected by said frame and an axle.

5. A side delivery rake comprising a mobile frame, a plurality of parallel axles rigidly connected to said frame and extending outwardly therefrom in a substantially horizontal plane, an echelon of rake wheels rotatably mounted on said axles, each of said rake wheels having a hub and a substantially rigid central portion connected and concentric thereto, each of said rake wheels further having resilient means extending outwardly from said central portion, said resilient means being connected to said central portion and incorporating a plurality of raking teeth at its periphery.

6. A side delivery rake according to claim 5 wherein said mobile frame is provided with at least one running wheel interconnected to an astern portion of one of said axles.

7. A side delivery rake according to claim 5 wherein said rake has draw means interconnected to said mobile frame and disposed forward thereof.

8. A side delivery rake according to claim 5 wherein said resilient means comprise a plurality of rods composed of steel wire extending from and connected to said central portion of said rake wheel, raking teeth extending radially outwardly of said rods, and tooth support means connected to said rods and each tooth, said tooth support means retaining each tooth in a substantially outwardly extending direction.

9. A side delivery rake according to claim 5 wherein said resilient means comprise a plurality of rods composed of steel wire extending from and hingedly connected to said central portion of said rake wheel, a resilient rim member hingedly connected to the other ends of said rods, and raking teeth disposed outwardly along said rim member.

10. A side delivery raking device comprised of a mobile frame, draw means attached to said frame, a plurality of parallel axles extending from said frame, an echelon of rake wheels mounted on said axles in overlapping relationship, the axes of said rake wheels and of said axles being held in fixed relationship to said frame, at least one supporting wheel interconnected to said frame, each of said rake wheels having a substantially rigid central portion and a concentric resilient portion disposed outwardly thereof with raking teeth incorporated around its periphery.

11. A device for laterally displacing grass, hay, or other material lying on the ground comprising a mobile frame, a plurality of axles extending from said frame, a plurality of rake wheels each of which is rotatably mounted on a said axle, said raking members being obliquely arranged with regard to the direction of travel and being put into rotation by their contact with the ground, said axles for said rake wheels being rigidly connected to said frame and directed in an astern direction.

12. A side delivery rake comprising a mobile frame having a frame beam, a plurality of axles rigidly connected to said frame beam and extending outwardly therefrom in a substantially horizontal plane, at least one rake wheel rotatably mounted on each of said axles, said rake wheels being arranged in an echelon on said frame beam and obliquely with respect to the intended direction of travel of said frame, said echelon of rake wheels being substantially parallel to said frame beam and said rake wheels incorporating raking teeth and substantially flexible means providing for said raking teeth.

13. A device for laterally displacing hay, grass, or other material lying on the ground comprising a frame, rotatable rake wheels arranged in an echelon along said frame, at least two of said rake wheels each having a rigid center portion and an intermediate flexible portion, said intermediate flexible portion disposed around and extending outwardly from said substantially rigid center portion thereof and a plurality of raking teeth extending outwardly from said flexible portion, and mounting means for mounting said rake wheels on said frame, each of said mounting means rotatably mounting each of said rake wheels on said frame and providing a constant vertical relationship between said frame and the center of each of said rake wheels.

14. A device according to claim 13 wherein said frame has a draw arm connected thereto and at least one supporting wheel interconnected to said frame and providing support therefor.

15. A device according to claim 13 wherein said mounting means comprise parallel axles rigidly secured to said frame and extending in a substantially horizontal direction therefrom.

16. A device for laterally displacing grass, hay, or other material lying on the ground comprising a frame, projections on said frame, an echelon of rake wheels on said projections and rigid therewith, each of said rake wheels having a hub and a substantially rigid central portion connected outwardly and concentrically with said hub with flexible means spaced outwardly of and around said central portion and connected thereto, said flexible means having raking teeth extending outwardly therefrom, and at least one supporting wheel interconnected to said frame and providing support therefor.

17. A device according to claim 16 wherein said projections from said frame comprise parallel axles rigidly secured to said frame and extending in a substantially horizontal direction therefrom.

18. A raking device comprising a mobile frame, supporting means attached to said frame for supporting said frame for ground traversing operation, a plurality of axles rigidly secured to said frame at an angle to the direction of movement of the frame, an echelon of raking members rotatably mounted on each of said axles which are rotated by contact with the ground and rakable substance thereon, flexible catching means incorporated in each of said raking members, said flexible catching means permitting compensation for the differences in the height of the frame above the ground when traversing uneven terrain.

References Cited in the file of this patent
UNITED STATES PATENTS

| | | |
|---|---|---|
| 2,652,679 | Krause | Sept. 22, 1953 |
| 2,680,343 | Enos | June 8, 1954 |
| 2,836,030 | Van der Lely | May 27, 1958 |
| 2,861,413 | Van der Lely | Nov. 25, 1958 |

OTHER REFERENCES

Information Circular #4, North Carolina Agricultural Experiment Station, May 1951.